United States Patent [19]

Ootani et al.

[11] Patent Number: 4,786,551

[45] Date of Patent: Nov. 22, 1988

[54] MAGNETIC RECORDING MEDIUM

[75] Inventors: Tsuyoshi Ootani, Tochigi; Junsaku Nakajima; Chiaki Abe, both of Utsunomiya, all of Japan; Ikuko Wada, Dianella, Australia

[73] Assignee: Kao Corporation, Tokyo, Japan

[21] Appl. No.: 116,791

[22] Filed: Nov. 5, 1987

[30] Foreign Application Priority Data

Dec. 26, 1986 [JP] Japan .................................. 61-309862

[51] Int. Cl.$^4$ ................................................ G11B 5/71
[52] U.S. Cl. ................................... 428/323; 252/62.54;
427/128; 427/131; 428/408; 428/694; 428/695;
428/522; 428/425.9; 428/900
[58] Field of Search ............ 428/694, 695, 900, 425.9,
428/323, 408, 328, 329, 522; 252/62.54;
360/134–136

[56] References Cited

U.S. PATENT DOCUMENTS

| | | | |
|---|---|---|---|
| 4,652,500 | 3/1987 | Ejiri | 428/695 |
| 4,666,784 | 5/1987 | Imukai | 428/900 |
| 4,690,864 | 9/1987 | Funahashi | 428/336 |
| 4,701,372 | 10/1987 | Akiyama | 428/900 |
| 4,741,959 | 5/1988 | Abe | 428/695 |

Primary Examiner—Ellis P. Robinson
Attorney, Agent, or Firm—Birch, Stewart, Kolasch & Birch

[57] ABSTRACT

Disclosed is a magnetic recording medium having a magnetic layer composed mainly of a magnetic powder and a resin binder, wherein the magnetic layer comprises (a) an ester compound comprising (a-1) an ester compound represented by the following formula (1):

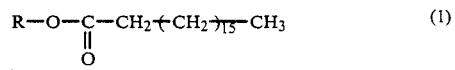

wherein
R stands for a branched alkyl group having 13 carbon atoms,
(a-2) butyl stearate and (a-3) butoxyethyl stearate, and (b) carbon black comprising (b-1) carbon black having an average single particle size of 10 to 50 m$\mu$ and (b-2) carbon black having an average single particle size of 200 to 1,000 m$\mu$.

This magnetic recording medium has an excellent durability and is utilized as a floppy disk or the like.

5 Claims, No Drawings

MAGNETIC RECORDING MEDIUM

BACKGROUND OF THE INVENTION (1) Field of the Invention:

The present invention relates to a magnetic recording medium. More particularly, the present invention relates to a magnetic recording medium having excellent durability.

(2) Description of the Prior Art:

A magnetic recording medium is generally prepared by coating a substrate such as a polyester film with a magnetic paint comprising a magnetic powder, a binder resin, an organic solvent and other necessary ingredients. A magnetic recording medium having reduced friction of a magnetic layer and excellent durability is especially required for a floppy disk because the magnetic layer of a disk is likely to wear away by contact with a magnetic head or jacket liner during the production or reproduction processes.

A known process for improving the wear resistance of the magnetic layer comprises incorporation of various lubricants in the magnetic layer.

Various compounds have been proposed as the lubricant, for example, fatty acids, fatty acid esters, fatty acid amides, liquid paraffins and waxes. However, the performance of these lubricants are unsatisfactory, especially in single use. For example, even if the durability is effectively improved, the compatibility with the resin binder is poor and bleeding of the lubricant from the surface of the magnetic layer often occurs, or even though bleeding is prevented, the improvement of the durability is insufficient.

Accordingly, some of the foregoing compounds are sometimes practically used in combination, but at the present, no sufficiently satisfactory lubricant system is obtained.

Carbon black is often incorporated into a magnetic layer of a magnetic recording medium such as a floppy disk. It is considered that the primary objects of incorporation of carbon black are to prevent accumulation of static charges in the magnetic layer and to impart a required light-shielding property to the magnetic recording medium.

Several carbon black blend systems have been proposed for these objects.

According to the inventors' investigations, it was confirmed that when a kind of carbon black is changed, also the durability of the magnetic recording medium is sometimes changed, and when a combination of a carbon black and a compound to be incorporated as lubricant is changed, the durability can be changed.

The inventors made a further research based on the above findings for the purpose of improving the durability of the magnetic recording medium.

Moreover, since a device equipped with a magnetic recording medium such as a floppy disk is often used outdoors recently, an excellent durable magnetic recording medium is eagerly desired.

SUMMARY OF THE INVENTION

The inventors made research with a view to developing a magnetic recording medium having a good lubricating property and a highly improved durability under various environmental conditions, and as the result, we have made the present invention.

According to the present invention, in a magnetic recording medium having a magnetic layer composed mainly of a magnetic powder and a resin binder, wherein the magnetic layer comprises (a) an ester compound comprising (a-1) an ester compound represented by the following formula (1):

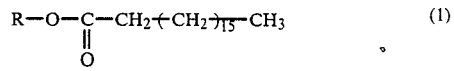

wherein
R stands for a branched alkyl group having 13 carbon atoms,
(a-2) butyl stearate and (a-3) butoxyethyl stearate, and (b) carbon black comprising (b-1) carbon black having an average single particle size of 10 to 50m$\mu$ and (b-2) carbon black having an average single particle size of 200 to 1,000m$\mu$.

DETAILED DESCRIPTION OF THE PREFERRED EMBODIMENTS

The lubricant system of the present invention comprises a restricted combination of ester compounds.

The ester compound represented by the formula (1) is tridecyl stearate, which alkyl chain is derived from a branched-chain alcohol. The branched alkyl chain of the ester may be partially substituted by an unbranched alkyl chain. However, it is preferred that the content of the branched tridecyl stearate in the whole tridecyl stearate be at least 60% by weight, especially at least 90% by weight.

As for the mixing ratios of the ester compound (a-1) represented by the formula (1), butyl stearate (a-2) and butoxyethyl stearate (a-3), it is preferred that the amounts of the ester compounds (a-1), (a-2) and (a-3) be 20 to 80 parts by weight, 10 to 40 parts by weight and 20 to 80 parts by weight, respectively, per 100 parts by weight of the sum of the ester compounds (a-1), (a-2) and (a-3).

This lubricant system may be mixed into a magnetic paint or may be dissolved in an appropriate solvent and sprayed on a magnetic coating. The lubricant system comprising the ester compounds (a-1), (a-2) and (a-3) is generally used in an amount of 1 to 15% by weight based on the magnetic powder.

The carbon black used in the present invention is defined by the average single particle size. Namely, the carbon black system comprises (b-1) carbon black having a average single particle size of 10 to 50m$\mu$ and (b-2) carbon black having an average single particle size of 200 to 1,000m$\mu$. The carbon black relating to the present invention may comprise two or more kinds of carbon blacks, if the average single particle size is within the above-mentioned size range. It is preferred that the amount of carbon black (b-2) be higher than that of carbon black (b-1). It also is preferred that the total amount of carbon black (b-1) and (b-2) be 8 to 25% by weight based on the magnetic powder.

In the magnetic recording medium of the present invention, it is considered that the specific ester compounds (a-1), (a-2) and (a-3) and the carbon blacks (b-1) and (b-2) having a specific particle size have some interactions and consequently the durability is highly improved, but the mechanism for the improvement is not clear yet.

The magnetic powder used in the present invention includes, for example, a fine acicular metal oxide, such as $\gamma$-Fe$_2$O$_3$, Fe$_3$O$_4$ and CrO$_2$, processed $\gamma$-Fe$_2$O$_3$ such as Co-covered $\gamma$-Fe$_2$O$_3$ and Co-doped $\gamma$-Fe$_2$O$_3$, iron metal powder, fine platy barium ferrite, magnetic powders with a portion of Fe atoms therein replaced by one or more members of Ti, Co, Zn, V and Nb, and ultrafine powders of metals and alloys such as Co, Fe-Co and Fe-Ni. The iron metal powder may be doped or surface-treated with nickel, cobalt, titanium, silicon or aluminum in the form of the metallic atoms, or oxide to improve its or in the form of a salt chemical stability. Furthermore, for stabilizing the iron metal powder, a thin oxide film is formed on the surface of the iron metal powder in an oxidative atmosphere. Such a treated one can also be used.

The resin binders that can be used in the present invention include, for example, polyurethanes, polyesters, polyvinyl chloride, vinyl acetate/vinyl acetate copolymers, polyacrylonitrile, nitrile rubbers, epoxy resins, alkyd resins, polyamides, polyacrylic acid esters, polymethacrylic acid esters, polyvinyl acetate, polyvinyl butyral, polyvinylidene chloride, vinylidene chloride copolymers, nitrocellulose, maleic acid-modified vinyl chloride/vinyl acetate copolymers and ethylcellulose. These resin binders may be used singly, or in combination with one another. In addition, they may be incorporated with a plasticizer or hardner to control the hardness of the resin.

The amount of the resin binder is usually 15 to 60 parts by weight for 100 parts by weight of the magnetic powder. No matter how great the adhesive strength might be the resin binder should be used in an amount more than 15 parts by weight; otherwise, the resulting magnetic coating lacks sufficient strength and adhesion with the substrate. On the other hand, the resin binder in excess of 60 parts by weight reduces the concentration of the magnetic powder in the magnetic coating, which leads to a decreased output of reproduction and aggravates the characteristics of the coating.

The present invention will now be described in detail with reference to the following examples that by no means limit the scope of the invention.

EXAMPLE 1

A mixture comprising the following ingredients was kneaded for about 15 hours in a sand mill.

| | |
|---|---|
| Co—covered $\gamma$-Fe$_2$O$_3$ | 100 parts by weight |
| Vinyl chloride/vinyl acetate resin | 18 parts by weight |
| Polyurethane resin | 28 parts by weight |
| Carbon black (average single particle size: 24 m$\mu$) | 8 parts by weight |
| Carbon black (average single particle size: 350 m$\mu$) | 10 parts by weight |
| Aluminum oxide | 4 parts by weight |
| Tridecyl stearate (branch content: at least 95% by weight) | 3.2 parts by weight |
| Butyl stearate | 1.6 parts by weight |
| Butoxyethyl stearate | 3.2 parts by weight |
| Toluene | 150 parts by weight |
| Cyclohexanone | 150 parts by weight |

Then, 7 parts by weight of a polyisocyanate compound (trimethylolpropane triisocyanate) was added to the kneaded mixture to obtain a magnetic paint.

The paint was applied to a 75 $\mu$m thick polyethylene terephthalate film. The coating weight was adjusted so that the film thickness is 1.5 $\mu$m after drying. Then, the coated film was subjected to a calender treatment and was allowed to stand at 60° C. for 4 days for curing. The film was punched into a disk, which was subsequently polished and enclosed in a jacket to prepare a floppy disk.

The disk was placed in an accelerated durability test drive and the running time required until the reproduction output was reduced to 70% based on the initial output was measured to examine durability.

The results are shown in Table 1.

The durability test conditions are as follows:

(1) The disk was maintained at a temperature of 5° C. and a relative humidity of 30% for 8 hours.

(2) The temperature and relative humidity were gradually elevated to 40° C. and 80%, respectively, over a period of 4 hours.

(3) The disk was maintained at a temperature of 40° C. and a relative humidity of 80% for 8 hours.

(4) The temperature and relative humidity were gradually lowered to 5° C. and 30%, respectively, over a period of 4 hours.

(5) The above procedures were repeated.

EXAMPLE 2

A floppy disk was prepared in the same manner as that described in Example 1 except that the amounts of tridecyl stearate (branch content: at least 95% by weight), butyl stearate and butoxyethyl stearate were 2.7 parts by weight, 2.5 parts by weight and 2.7 parts by weight, respectively, and a carbon black system comprising 3 parts by weight of carbon black having an average single particle size of 20m$\mu$ and 10 parts by weight of carbon black having an average single particle size of 350m$\mu$ was used, and the disk was subjected to the durability test.

The results are shown in Table 1.

EXAMPLE 3

A floppy disk was prepared in the same manner as that described in Example 1 except that a carbon black system comprising 1 part by weight of carbon black having an average single particle size of 20m$\mu$, 4 parts by weight of carbon black having an average single particle size of 30m$\mu$ and 10 parts by weight of carbon black having an average single particle size of 350m$\mu$ was used. The floppy disk was subjected to the durability disk.

The results are shown in Table 1.

EXAMPLE 4

A floppy disk was prepared in the same manner as that described in Example 1 except that a carbon black system comprising 4 parts by weight of carbon black having an average single particle size of 15m$\mu$ and 11 parts by weight of carbon black having an average single particle size of 350m$\mu$, 30% by weight of the vinyl chloride/vinyl acetate copolymer resin and 15 parts by weight of a nitrile/butadiene rubber were used instead. The floppy disk was subjected to the durability test.

The results are shown in Table 1.

COMPARATIVE EXAMPLE 1

A floppy disk was prepared in the same manner as that described in Example 1 except that a mixture comprising 4 parts by weight of oleyl oleate and 4 parts by weight of oleic acid was used instead of the lubricant comprising tridecyl stearate, butyl stearate and butoxyethyl stearate and 10 parts by weight of carbon black having an average single particle size of 30m$\mu$ was used as a carbon black system. The floppy disk was subjected to the durability test.

The results are shown in Table 1.

COMPARATIVE EXAMPLE 2

A floppy disk was prepared in the same manner as that described in Example 1 except that a mixture comprising 4 parts by weight of tridecyl stearate and 4 parts by weight of isocetyl stearate was used as the lubricant and 13 parts by weight of carbon black having an average single particle size of 62mμ was used as a carbon black system, and the floppy disk was subjected to the durability test.

The results are shown in Table 1.

COMPARATIVE EXAMPLE 3

A floppy disk was prepared in the same manner as that described in Example 1 except that a mixture comprising 3 parts by weight of tridecyl stearate, 2 parts by weight of isocetyl stearate and 3 parts by weight of oleic acid was used as the lubricant and a carbon black system comprising 4 parts by weight of carbon black having an average single particle size of 20mμ and 5 parts by weight of carbon black having an average single particle size of 62mμ was used, and the floppy disk was subjected to the durability test.

The results are shown in Table 1.

COMPARATIVE EXAMPLE 4

A floppy disk was prepared in the same manner as that described in Example 1 except that a mixture comprising 2.5 parts by weight of butyl stearate and 5.5 parts by weight of butoxyethyl stearate was used as the lubricant and a carbon black system comprising 4 parts by weight of carbon black having an average single particle size of 15mμ and 5 parts by weight of carbon black having an average single particle size of 30mμ were used. The floppy disk was subjected to the durability test.

The results are shown in Table 1.

TABLE 1

| Floppy Disk | Durability (hours) |
| --- | --- |
| Example 1 | 2400 |
| Example 2 | 2310 |
| Example 3 | 2020 |
| Example 4 | 2200 |
| Comparative Example 1 | 50 |
| Comparative Example 2 | 125 |
| Comparative Example 3 | 220 |
| Comparative Example 4 | 105 |

What is claimed is:

1. A magnetic recording medium having a magnetic layer composed mainly of a magnetic powder and a resin binder, wherein said magnetic layer comprises
   (a) an ester compound comprising (a-1) a compound represented by the following formula (1):

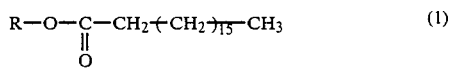

$$R-O-C(=O)-CH_2(CH_2)_{15}-CH_3 \quad (1)$$

wherein
   R stands for a branched alkyl group having 13 carbon atoms which may be partially substituted with an unbranched alkyl group having 13 carbon atoms, (a-2) butyl stearate and (a-3) butoxyethyl stearate, wherein the amounts of a-1, a-2 and a-3 are 20 to 80 parts by weight, 10 to 40 parts by weight, and 20 to 80 parts by weight, respectively per 100 parts by weight of the sum of a-1, a-2 and a-3; and
   (b) carbon black comprising (b-1) carbon black having an average single particle size of 10 to 50mμ and (b-2) carbon black having an average single particle size of 200 to 1,000mμ; and
   wherein said ester compound is in an amount of 1 to 15% by weight based on the weight of said magnetic powder 2. The magnetic recording medium as set forth in claim 1 wherein said branched alkyl group is at least 60% by weight of compound a-1.

3. The magnetic recording medium as set forth in claim 1, wherein the amount of carbon black (b-2) is larger than that of the carbon black (b-1).

4. The magnetic recording medium as set forth in claim 1, wherein the total amount of said carbon blacks (b-1) and (b-2) is 8 to 25% by weight based on the magnetic powder.

5. The magnetic recording medium as set forth in claim 2 wherein said branched alkyl group is at least 90% by weight of compound a-1.

* * * * *